Patented Sept. 17, 1946

2,407,937

UNITED STATES PATENT OFFICE 2,407,937

TERPENE DERIVATIVES

Alfred L. Rummelsburg, Wilmington, Del., assignor to Hercules Powder Company, Wilmington, Del., a corporation of Delaware No Drawing. Application May 31, 1941, Serial No. 396,214

14 Claims. (Cl. 260—468)

This invention relates to a new class of esters and method of producing the same; and more particularly, it relates to a new class of organic esters produced by the esterification of the alcohols obtained by the hydrogenation of a condensation product of an acyclic terpene having three double bonds per molecule with crotonaldehyde.

In accordance with this invention the alcohols employed in carrying out the esterification are those resulting from the hydrogenation of a condensation product of an acyclic terpene having three double bonds per molecule with crotonaldehyde. In this manner there is obtained a cyclic primary alcohol which may or may not be saturated depending upon the conditions under which the reaction is carried out.

In preparing the condensation product with crotonaldehyde, any acyclic terpene having three double bonds per molecule, as for example, allo-ocimene, ocimene, myrcene, etc., may be employed. However, allo-ocimene is the preferred material to employ inasmuch as, in addition to having three double bonds per molecule, it has them in a triply conjugated arrangement. Hereinafter, an acyclic terpene having three double bonds per molecule will be referred to for convenience as an acyclic terpene.

Employing any of the aforesaid acyclic terpenes, a condensation product with crotonaldehyde may be prepared. These condensation products are unsaturated, cyclic aldehydes and are obtained in as high as 70% yields by heating the acyclic terpene with an excess of crotonaldehyde at an elevated temperature for several hours. In the reaction which takes place, one molecule of the acyclic terpene may react with one molecule of crotonaldehyde or two molecules of the former may react with one of the latter, or vice versa. The extent to which each of these reactions takes place will depend upon the relative proportion of the reactants and the conditions of reaction. Furthermore, during this condensation any of the above compounds or the reactants may polymerize. The compound which will greatly predominate in the reaction mixture, however, will be that formed when one molecule of acyclic terpene condenses with one molecule of crotonaldehyde, particularly so when the latter is used in slight excess.

As an example of this condensation reaction, approximately equi-molar proportions of allo-ocimene and crotonaldehyde may be heated together at 200° C. for say 2.5 hours. The compound representing the combination of equi-molar proportions of the reactants may be separated by vacuum distillation and will be found to be a fairly viscous, yellowish liquid having the following average characteristics:

B. P. (3 mm.) _____° C.__ 117–119
$n_d^{17}$ _____ 1.4952
$d_0^{17}$ _____ 0.9256

It is this compound which is contemplated wherever, hereinafter, use is made of "the allo-ocimene-crotonaldehyde condensate." It may otherwise be referred to as trimethyl butenyl tetrahydrobenzaldehyde. However, if desired, the crude condensate may itself be employed in the processes of the invention, as may any of the compounds separable therefrom.

To form a cyclic, primary alcohol, then, in accordance with my invention, any of the aforesaid condensation products of acyclic terpenes with crotonaldehyde is reduced with hydrogen either with or without the use of a suitable hydrogenation catalyst. Preferably the condensate resulting when equi-molar proportions of the reactants combine will be employed. It is, however, preferable to use a catalyst inasmuch as greater selectivity is thereby obtainable. It is possible by the use of particular catalysts to hydrogenate only the aldehyde group of the condensate molecule. The product, where "the allo-ocimene-crotonaldehyde condensate" has been employed, is a substitution product of tetrahydrobenzyl alcohol; and more particularly, it is trimethyl butenyl tetrahydrobenzyl alcohol. On the other hand, certain catalysts, in conjunction with the use of relatively high conditions of temperature and pressure, lead to the hydrogenation of the ethylenic double bonds of the molecule as well as the aldehyde group. In this instance, where "the allo-ocimene-crotonaldehyde condensate" has been employed, the product is a substitution product of hexahydrobenzyl alcohol; and more particularly, it is trimethyl butyl hexahydrobenzyl alcohol. The production of these alcohols is described with greater particularity in my co-pending application for United States Letters Patent, Serial No. 396,216, filed May 31, 1941.

The purified monomeric saturated alcohol resulting from the hydrogenation of "the allo-ocimene-crotonaldehyde condensate" has been found to have the following average characteristics:

Percent OH _____ 7.0–8.5
$n_d^{20° C.}$ _____ 1.480–1.481
Sp. gr. $\frac{20° C.}{4° C.}$ _____ 0.915–0.925
B. P. (20 mm.) _____°C__ 120–130+

The wide boiling range exhibited is probably due to the presence of various isomeric forms of the alcohol in the product. In comparison with the above, the purified monomeric unsaturated alcohol resulting from the hydrogenation of only the aldehyde group of "the allo-ocimene-crotonaldehyde condensate" has been found to have a boiling point within the range of from 129 to 140° C. at 3-5 mm. pressure.

Wherever, hereinafter, a "saturated" alcohol is referred to, there is contemplated any saturated primary alcohol resulting from the complete reduction of any of the acyclic terpene-crotonaldehyde condensates hereinabove discussed; and wherever an "unsaturated" alcohol is referred to, there is contemplated any unsaturated primary alcohol resulting from merely the reduction of the aldehyde group or groups of said acyclic terpene-crotonaldehyde condensates.

The esters may be acid or neutral and may be prepared by various processes, as under atmospheric or other pressures, with or without the use of an esterification catalyst, etc. Further, the esters may be prepared with the use of various organic monobasic or polybasic acids. Monobasic acids, such as, formic, acetic, propionic, n-butyric, isobutyric, n-valeric, isovaleric, trimethylacetic, caproic, isocaproic, diethylacetic, n-heptoic, n-octoic, n-nonoic, lauric, myristic, palmitic, stearic, etc., acids; substituted monobasic acids, such as, gallic, glycollic, lactic, salicyclic, etc., acids; polybasic acids, such as, oxalic, malonic, methylmalonic, succinic, methylsuccinic, glutaric, adipic, pimelic, suberic, azelaic, sebacic, maleic, citraconic, mesaconic, itaconic, aconitic, glutaconic, phthalic, camphoric, etc., acids; substituted polybasic acids, such as citric, malic, tartaric, tartronic, etc., acids; and resin acids, such as, abietic, pimaric, sapinic, etc. acids are all contemplated within the invention. In addition, it is intended that the condensation products of the terpenes and maleic anhydride, produced as described in U. S. Patent 1,993,025, granted to E. G. Peterson and E. R. Littmann, March 5, 1935 and in U. S. Patent 1,993,031, granted to E. G. Peterson, March 5, 1935, be included. Condensation products of maleic anhydride with such unsaturates as butadiene, allo-ocimene, rosin, rosin esters, etc. may be used. It is, of course, also contemplated that corresponding anhydrides of the above acids where available may be used equivalently in carrying out the processes of the invention.

If desired, in the production of the esters, an esterification catalyst may be employed and as such may be used, for example, sulfuric acid, dry hydrogen chloride, para-toluene sulfonic acid, etc., and the esterification may be effected under atmospheric or other pressure.

In the preparation of the esters of either a "saturated" or an "unsaturated" alcohol in accordance with this invention, the esterification is preferably carried out at temperatures within the range of from about 20° C. to about 275° C., depending upon the particular acid or anhydride utilized and upon whether a catalyst is employed. The pressures preferably used may be varied from atmospheric to about 500 lbs. per square inch, depending upon the boiling point of the acid and the temperature necessary for esterification. The period required for the esterification will, of course, be determined by the particular temperature and pressure utilized, by the particular acid used, as well as by other factors.

On completion of the heating period if the resulting ester is a liquid it may desirably be washed with water to remove excess water-soluble acid if such has been used and also to remove the esterification catalyst if one has been used. Also, the ester may be washed with an aqueous alkaline solution. For example, if sulfuric acid is used as the catalyst, the product is given an alkaline wash with, for example, sodium carbonate solution, to remove any trace of sulfuric acid and any acid ester. The product is then given a final water wash; and the ester is then dried in any suitable manner, for example, with anhydrous potassium carbonate, etc.

If it be desired to further purify the ester, it may, if volatile, be distilled under reduced pressure. The residue which does not distill will comprise the ester of any polymeric alcohols which may have been present originally in the alcohol employed or which may have formed from the monomeric alcohols during esterification. Alternatively, some of the esters may be refined by heating to a temperature of about 150° C. to 275° C. and passing in carbon dioxide or some other inert gas, to remove any unreacted volatile constituents.

It should be understood that in the above-mentioned processes I may employ mixtures of more than one alcohol for the esterification contemplated. For example, it is possible to esterify a mixture of "saturated" alcohols or a mixture of "unsaturated" alcohols with a suitable monobasic or polybasic acid. Further, it is possible to esterify a mixture of "saturated" alcohols or a mixture of "unsaturated" alcohols with a mixture of monobasic and/or polybasic acids. It is also contemplated to react a mixture of "saturated" or "unsaturated" alcohols and a polyhydric alcohol with a suitable polybasic acid or mixture of polybasic acids. In this manner modified esters may be obtained.

As illustrative of the practical production of esters in accordancce with this invention, the following examples are given. All parts and percentages herein are by weight unless otherwise specified.

*Example 1*

To 24 parts of a saturated alcohol obtained by the hydrogenation of "the allo-ocimene-crotonaldehyde condensate," having a hydroxyl content of 6.8%, were added 61 parts of acetic anhydride and 0.18 part of 95% sulfuric acid. The components were intimately mixed and allowed to stand at room temperature for 15 hours. The product was water washed to remove the sulfuric acid and excess acetic anhydride and then given an alkaline wash with sodium carbonate solution to remove any trace of acid present. The product was then given a final water wash and the excess water removed under reduced pressure. A pleasant smelling, mobile liquid remained having an odor similar to that of terpinyl acetate, an acid number of 0 and a saponification number of 190.

*Example 2*

To 31 parts of the same saturated alcohol as employed in Example 1, having a hydroxyl content of 6.8% were added 15 parts of a condensation product of terpinolene with maleic anhydride. The components were intimately mixed and heated at 180° C. for 2 hours and further heated at 210° C. for 5 additional hours. The product was a viscous, pale colored resin having an acid number of 38.

Example 3

To 32 parts of the same saturated alcohol as employed in Example 1, having a hydroxyl content of 7.2%, were added 10 parts of phthalic anhydride. The components were intimately mixed and heated at 170° C. for 1 hour. Heating was continued at a temperature of from 200 to 220° C. for 4 hours under an air condenser, allowing water to pass off. The reaction mixture was blown with $CO_2$ to remove unreacted anhydride and then cooled. A viscous resin resulted having an acid number of 27.5 and a saponification number of 216.

Example 4

To 25 parts of the same saturated alcohol as employed in Example 1, having a hydroxyl content of 8.0%, were added 50 parts of stearic acid. The components were intimately mixed and heated under an air condenser at 190 to 220° C. for 8 hours, allowing water to pass off. The excess alcohol was removed by distillation under a reduced pressure of 1 mm. and at a bath temperature of 215° C. The cooled product was a liquid which crystallized partly on standing. It had an acid number of 12.5 and a saponification number of 134.

Example 5

To 40 parts of an unsaturated alcohol obtained by reduction of the aldehyde group of "the allo-ocimene-crotonaldehyde condensate," having a hydroxyl content of 7.2%, were added 8.1 parts of maleic anhydride. The components were intimately mixed and then heated at a temperature of from 190° C. to 200° C. for 4 hours. Heating was continued at a temperature of 220° C. for 1 hour at the end of which time esterification was complete as evinced by a ceasing of water formation. Unreacted constituents were removed by distillation at a pressure of 7 mm. The product was a viscous oil having an acid number of 38.

Example 6

To 40 parts of the same unsaturated alcohol as employed in Example 5, having a hydroxyl content of 7.3%, were added 21 parts of a condensation product of terpinolene with maleic anhydride. The constituents were intimately mixed and heated at a temperature of from 200 to 220° C. until water formation ceased. The unreacted constituents were removed by distillation at a pressure of 5 mm. A viscous resin remained having an acid number of 40 and a drop melting point of about 65° C.

Example 7

To 40 parts of the same unsaturated alcohol as employed in Example 5, having a hydroxyl content of 7.2%, were added 8 parts of succinic acid. The components were intimately mixed and were heated under an air condenser at 200° C. for 3 hours. Heating was continued for 4 hours, at a temperature of from 220 to 230° C. until water formation ceased. The unreacted constituents were removed by distillation at a reduced pressure of 1 mm. and at a bath temperature of 200° C. The product was a viscous resin, having an acid number of 35.

Example 8

To 40 parts of the same unsaturated alcohol as employed in Example 5, having a hydroxyl content of 7.3%, were added 40 parts of linseed oil fatty acids. The components were intimately mixed and heated under an air condenser at 200° C. for 3 hours. Heating was further continued at a temperature of from 220 to 230° C. for 4 hours when water formation ceased. The unreacted constituents were removed by distillation at a reduced pressure of 1 mm. and at a bath temperature of 200° C. The product was a viscous oil, having an acid number of 13.

Example 9

To 40 parts by weight of the same unsaturated alcohol as employed in Example 5, having a hydroxyl content of 7.3%, were added 12.5 parts of phthalic anhydride. The constituents were intimately mixed and then heated under an air condenser at 200° C. for 3 hours. Heating was continued at a temperature of from 220 to 230° C. for 4 hours when water formation ceased. The unreacted constituents were removed by distillation at a reduced pressure of 1 mm. and at a bath temperature of 200° C. The product was a solid resin, having an acid number of 25.

Example 10

To 150 parts of the same unsaturated alcohol as employed in Example 5, having a hydroxyl content of 7.2%, were added 150 parts of acetic anhydride containing about 0.1 part of 95% sulfuric acid. The components were intimately mixed and allowed to stand at room temperature for 18 hours. The resultant product was water washed, and then given an alkaline wash and a further water wash. This was followed by reduced pressure distillation at 1 mm. The resulting liquid had an acid number of 0 and a saponification number of 195.

Example 11

A mixed ester of the same unsaturated alcohol as employed in Example 5 and glycerol with phthalic anhydride was prepared in the following manner. To 117 parts of the unsaturated alcohol and 16 parts of glycerol were added 74 parts of phthalic anhydride. The components were intimately mixed and heated for 2 hours at a temperature of from 170 to 180° C. Heating was continued at 220° C. under an air condenser until water formation ceased. The unreacted constituents were removed by subjecting the reaction mixture to distillation at a pressure of 1 mm. and a bath temperature of 220° C. The product was a hard, non-gelled resin, having an acid number of 20.

Example 12

A mixture of the same unsaturated alcohol as employed in Example 5 and glycerol was esterified with terpinolene-maleic anhydride condensate in the following manner. To 117 parts of the unsaturated alcohol and 16 parts of glycerol were added 113 parts of terpinolene-maleic anhydride. The constituents were intimately mixed and heated for 2 hours at a temperature of from 170° C. to 180° C. Heating was continued for 5 hours at 220° C. under an air condenser when water formation ceased. The product was subjected to a pressure of 1 mm. and a bath temperature of 220° C. to remove the unreacted components. There resulted a hard, non-gelled resin, having an acid number of 30.

It will be realized that in the processes hereinabove described, when a polyhydric alcohol is employed for the esterification in conjunction with a saturated and/or an unsaturated alcohol prepared from an acyclic terpene-crotonaldehyde condensate as described previously, and when a polybasic acid is also employed, a simple ester does not result. Polymerization takes place and the type of product formed is dependent upon the alcohol and acid employed, the proportions of the same, as well as the temperature at which combination is allowed to take place. Carrying out the reaction under such conditions may lead to the formation of hard resinous solids; and if the esterification is carried sufficiently far, there will be formed insoluble gels. To avoid gelation it is necessary to employ an excess of the polyhydric alcohol or to interrupt the reaction just as gelation is about to commence.

The esters derived through the practice of this invention have many and interesting uses. They are particularly valuable as synthetic resins. As such, they may be employed either alone or in conjunction with other materials as laminating compounds for fibrous sheet material. These new resins are particularly useful as ingredients in paints, lacquers and varnishes. The esters prepared from the "saturated" alcohols are of definite value in the protective coating industry inasmuch as they are stable to oxidation and other deterioration. The resulting protective films will be found to retain their original elasticity over long periods of time. The esters prepared from the "unsaturated" alcohols, are on the other hand useful in the preparation of varnishes since they are reactive with drying oils.

It will be understood that the details and examples hereinbefore set forth are illustrative only and that the invention as broadly described and claimed is in no way limited thereby.

This application is a continuation-in-part of my application for United States Letters Patent, Serial No. 370,666, filed December 18, 1940.

What I claim and desire to protect by Letters Patent is:

1. An ester of a carboxylic organic acid and trimethyl butyl hexahydrobenzyl alcohol.

2. An ester of a monobasic carboxylic organic acid and trimethyl butyl hexahydrobenzyl alcohol.

3. An ester of an aliphatic monobasic carboxylic organic acid and trimethyl butyl hexahydrobenzyl alcohol.

4. An ester of acetic acid and trimethyl butyl hexahydrobenzyl alcohol.

5. An ester of a polybasic carboxylic organic acid and trimethyl butyl hexahydrobenzyl alcohol.

6. An ester of phthalic acid and trimethyl butyl hexahydrobenzyl alcohol.

7. An ester of a polybasic carboxylic organic acid and a mixture of trimethyl butyl hexahydrobenzyl alcohol and a polyhydric alcohol.

8. An ester of a carboxylic organic acid and trimethyl butenyl tetrahydrobenzyl alcohol.

9. An ester of a monobasic carboxylic organic acid and trimethyl butenyl tetrahydrobenzyl alcohol.

10. An ester of an aliphatic monobasic carboxylic organic acid and trimethyl butenyl tetrahydrobenzyl alcohol.

11. An ester of a polybasic carboxylic organic acid and trimethyl butenyl tetrahydrobenzyl alcohol.

12. An ester of a terpene-maleic anhydride condensate and trimethyl butenyl tetrahydrobenzyl alcohol.

13. An ester of a polybasic carboxylic organic acid and a mixture of trimethyl butenyl tetrahydrobenzyl alcohol and a polyhydric alcohol.

14. An ester of a carboxylic organic acid and a primary alcohol selected from the group consisting of trimethyl butyl hexahydrobenzyl alcohol and trimethyl butenyl tetrahydrobenzyl alcohol.

ALFRED L. RUMMELSBURG.